US012661805B2

(12) United States Patent
Song et al.

(10) Patent No.: US 12,661,805 B2
(45) Date of Patent: Jun. 23, 2026

(54) SUBSTRATE PROCESSING APPARATUS

(71) Applicant: Samsung Electronics Co., Ltd.,
Suwon-si (KR)

(72) Inventors: Hyeon Dong Song, Suwon-si (KR);
Jun Young Moon, Suwon-si (KR);
Sang Woo Park, Suwon-si (KR); **Un
Ki Jeong, Suwon-si (KR); Ji Ho Uh**,
Suwon-si (KR); Hyun Soo Chun,
Suwon-si (KR)

(73) Assignee: **SAMSUNG ELECTRONICS CO.,
LTD.**, Suwon-si (KR)

( * ) Notice: Subject to any disclaimer, the term of this
patent is extended or adjusted under 35
U.S.C. 154(b) by 331 days.

(21) Appl. No.: 18/413,491

(22) Filed: Jan. 16, 2024

(65) Prior Publication Data

US 2024/0278437 A1 Aug. 22, 2024

(30) Foreign Application Priority Data

Feb. 16, 2023 (KR) ........................ 10-2023-0020744
Mar. 29, 2023 (KR) ........................ 10-2023-0041192

(51) Int. Cl.
B25J 13/08 (2006.01)
B25J 9/02 (2006.01)
(Continued)

(52) U.S. Cl.
CPC ............... B25J 13/089 (2013.01); B25J 9/02
(2013.01); B25J 9/1682 (2013.01); **B25J
11/0095** (2013.01)

(58) Field of Classification Search
None
See application file for complete search history.

(56) References Cited

U.S. PATENT DOCUMENTS 5,759,006 A * 6/1998 Miyamoto .......... H10P 72/1912
414/789.5
6,425,280 B1 * 7/2002 Ames .................... G03F 9/7011
33/645
(Continued)

FOREIGN PATENT DOCUMENTS

JP 201585412 A * 5/2015 .............. B25J 17/00
KR 20060100958 A * 9/2006 ............. E04B 9/065
(Continued)

*Primary Examiner* — Kidest Worku
(74) *Attorney, Agent, or Firm* — Muir Patent Law, PLLC

(57) ABSTRACT

A substrate processing apparatus includes a body which
includes an upper face and side faces, and extends in a first
direction, a plurality of robot arms which are installed on the
upper face of the body, extend in the first direction, are
spaced apart from each other in a second direction perpen-
dicular to the upper face of the body, and are able to grip a
wafer, and an alignment jig (JIG) which is installed on the
upper face and side faces of the body, and senses positions
of the plurality of robot arms, wherein the alignment jig
includes, a horizontal frame disposed on the upper face of
the body, a vertical frame disposed on the side faces of the
body, and a displacement sensor installed on the horizontal
frame and the vertical frame to sense coordinates of upper
faces of the plurality of robot arms and side faces of the
plurality of robot arms, the displacement sensor includes a
first sensor and a second sensor which are spaced apart from
side faces of the plurality of robot arms in a third direction
perpendicular to the first and second directions and spaced
apart from each other in the first direction, and an upper face
of the displacement sensor is disposed at a vertical level
higher than vertical levels of the upper faces of each of the
plurality of robot arms.

20 Claims, 24 Drawing Sheets

(51) Int. Cl.
    *B25J 9/16*         (2006.01)
    *B25J 11/00*       (2006.01)

(56)              References Cited

U.S. PATENT DOCUMENTS

| | | | |
|---|---|---|---|
| 10,151,853 B2 | 12/2018 | Won et al. | |
| 2013/0190924 A1* | 7/2013 | Kimura | B25J 9/1612 |
| | | | 901/9 |
| 2016/0133502 A1* | 5/2016 | Won | H10P 72/7602 |
| | | | 901/46 |
| 2016/0329234 A1* | 11/2016 | Krupyshev | B25J 9/042 |
| 2018/0073614 A1* | 3/2018 | Claffee | B25J 9/123 |
| 2019/0218041 A1* | 7/2019 | Caveney | B65G 47/901 |
| 2021/0210368 A1 | 7/2021 | Yokoyama et al. | |

FOREIGN PATENT DOCUMENTS

| | | |
|---|---|---|
| KR | 10-2010-0063369 A | 6/2010 |
| KR | 10-2012-0042658 A | 5/2012 |
| KR | 10-2016-0055010 A | 5/2016 |
| KR | 10-2018-0053967 A | 5/2018 |
| KR | 10-2021-0125067 A | 10/2021 |

* cited by examiner

SUBSTRATE PROCESSING APPARATUS

CROSS-REFERENCE TO RELATED APPLICATION

This application claims priority from Korean Patent Application No. 10-2023-0020744 filed on Feb. 16, 2023 and No. 10-2023-0041192 filed on Mar. 29, 2023 in the Korean Intellectual Property Office, and all the benefits accruing therefrom under 35 U.S.C. 119, the contents of each of which in its entirety are herein incorporated by reference.

BACKGROUND

1. Field of the Disclosure

The present disclosure relates to a substrate processing apparatus.

2. Description of the Related Art

In order to manufacture a semiconductor element or a display device such as a liquid crystal display, an organic light-emitting diode (OLED) display, and a micro light emitting diode (microLED) display, wafers or substrates are subjected to various processes such as photolithography, etching, ashing, ion implantation, thin film deposition, and cleaning.

In order to perform various processes in various chambers, it is desirable to convey or transport wafers to the chambers. At this time, a plurality of wafers may be moved at once. A plurality of robot arms are required to move the plurality of wafers at once, and when the plurality of robot arms are aligned, the wafers may be conveyed or transported accurately.

SUMMARY

Aspects of the present disclosure provide a substrate processing apparatus having improved reliability.

However, aspects of the present disclosure are not restricted to the one set forth herein. The above and other aspects of the present disclosure will become more apparent to one of ordinary skill in the art to which the present disclosure pertains by referencing the detailed description of the present disclosure given below.

According to an aspect of the present disclosure, a substrate processing apparatus includes a body which includes an upper face and side faces, and extends lengthwise in a first direction, a plurality of robot arms which are installed on the upper face of the body, extend in the first direction, and are spaced apart from each other in a second direction perpendicular to the upper face of the body, wherein each of the plurality of robot arms is configured to grip a wafer, and an alignment jig (JIG) which is installed on the upper face and side faces of the body, and senses positions of the plurality of robot arms. The JIG includes a horizontal frame disposed on the upper face of the body, a vertical frame disposed on the side faces of the body, and a displacement sensor installed on the horizontal frame and the vertical frame to sense coordinates of upper faces of the plurality of robot arms and side faces of the plurality of robot arms. The displacement sensor includes a first sensor and a second sensor which are spaced apart from side faces of the plurality of robot arms in a third direction perpendicular to the first and second directions and spaced apart from each other in the first direction. An upper face of the displacement sensor is disposed at a vertical level higher than a vertical level of an upper face of an uppermost robot arm, in the second direction, of the plurality of robot arms.

According to an aspect of the present disclosure, a substrate processing apparatus includes a body which includes an upper face and side faces, and extends lengthwise in a first direction, first and second robot arms which are installed on the upper face of the body, extend in the first direction, and are spaced apart in a second direction perpendicular to the upper face of the body, wherein each of the first and second robot arms is configured to grip a wafer, first and second sensors which are installed on the upper face and side faces of the body, sense coordinates of an upper face and side faces of the first and second robot arms, and are spaced apart from each other in the first direction; and a control unit configured to align the first and second robot arms using sensed positions of the first and second robot arms. The control unit is configured to determine whether the first robot arm and the second robot arm are parallel with each other using coordinates of the upper face and side faces of the first robot arm and coordinates of the upper face and side faces of the second robot arm, and calculate a degree of twist of a yaw axis between the first robot arm and the second robot arm using: a distance in a third direction from the first sensor to the side face of the first robot arm, a distance in the third direction from the second sensor to the side face of the second robot arm, a distance from the first position to the second position, and a distance in the first direction between the first sensor and the second sensor. The first to third directions are perpendicular to each other.

According to an aspect of the present disclosure, a substrate processing apparatus includes a loading and unloading unit to and from which a wafer is loaded and unloaded, a batch type chamber which performs semiconductor processes on the wafer, and a conveying robot which conveys the wafer to the batch type chamber. The conveying robot includes a body which includes an upper face and side faces, and extends lengthwise in a first direction, first and second robot arms which are installed on the upper face of the body, extend in the first direction, and are spaced apart in a second direction perpendicular to the upper face of the body, wherein each of the first and second robot arms is configured to grip the wafer, an alignment jig (JIG) which is installed on the upper face and side faces of the body, and senses positions of the first and second robot arms, and a control unit configured to align the first and second robot arms using the sensed positions of the first and second robot arms. The JIG includes a horizontal frame disposed on the upper face of the body, a vertical frame disposed on the side face of the body, and a displacement sensor installed on the horizontal frame and the vertical frame to sense coordinates of upper faces and side faces of the first and second robot arms. The displacement sensor includes a first sensor and a second sensor which are spaced apart from the side faces of the first and second robot arms in a third direction perpendicular to the first and second directions, and are spaced apart from each other in the first direction. The side face of the first robot arm includes a first position sensed by the first sensor and a second position sensed by the second sensor, and the upper face of the first robot arm includes a third position and a fourth position spaced apart from each other. The control unit is configured to determine whether the first robot arm and the second robot arm are parallel with each other using coordinates of the upper face and side faces of the first robot arm and coordinates of the upper face and side faces of the second robot arm. The control unit is configured to calculate a degree of twist of a yaw axis between the first robot arm and the second robot arm using a distance in the third direction from the first sensor to the first position of the side face of the first robot arm, a distance in the third direction from the second sensor to the second position, a distance from the first position to the second position, and a distance in the first direction between the first sensor and the second sensor. The control unit is configured to calculate a degree of twist of a pitch axis between the first robot arm and the second robot arm using a distance in the second direction from the second position to an imaginary plane that is parallel to a reference plane extending in the first direction and the second direction, the distance from the first position to the second position, and the distance in the first direction between the first sensor and the second sensor. The control unit is configured to calculate a degree of a twist of a roll axis between the first robot arm and the second robot arm using a distance from the third position to the fourth position, a distance in the third direction from the third position to the fourth position, and a distance in the second direction from the third position to the fourth position.

BRIEF DESCRIPTION OF THE DRAWINGS

The above and other aspects and features of the present disclosure will become more apparent by describing in detail exemplary embodiments thereof with reference to the attached drawings, in which:

FIG. 1 is an exemplary diagram for describing a substrate processing apparatus according to some embodiments.

DETAILED DESCRIPTION OF THE EMBODIMENTS

Figure 2:
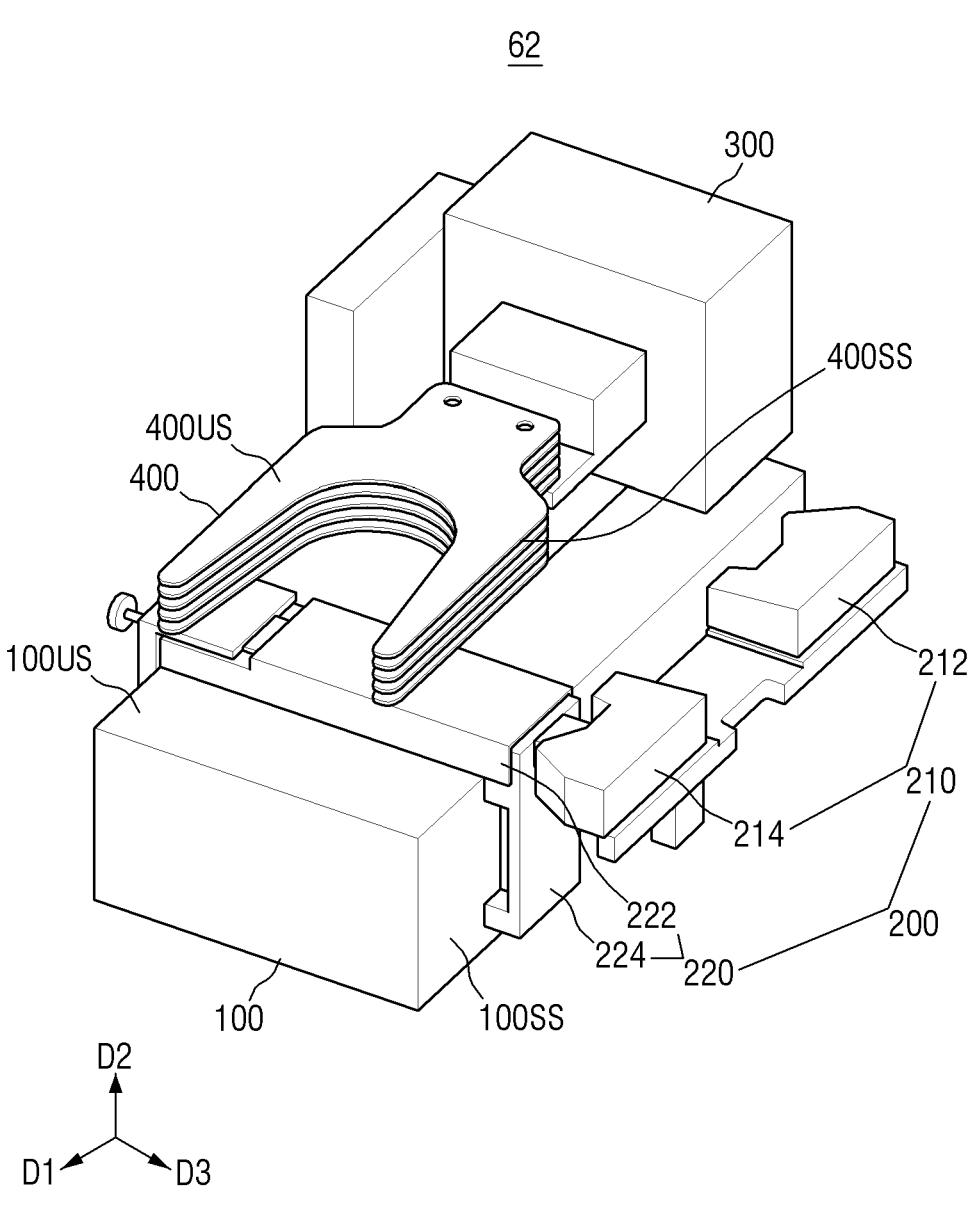
FIG. 2 is a perspective view for explaining a conveying robot of FIG. 1.

Although terms such as first and second are used to describe various elements or components in the present specification, it goes without saying that these elements or components are not limited by these terms. These terms are only used to distinguish a single element or component from other elements or components. Therefore, it goes without saying that a first element or component referred to below may be a second element or component within the technical idea of the present disclosure.

A substrate processing apparatus and a method of operating the substrate processing apparatus according to some embodiments will be described below with reference to the accompanying drawings.

Figure 1:
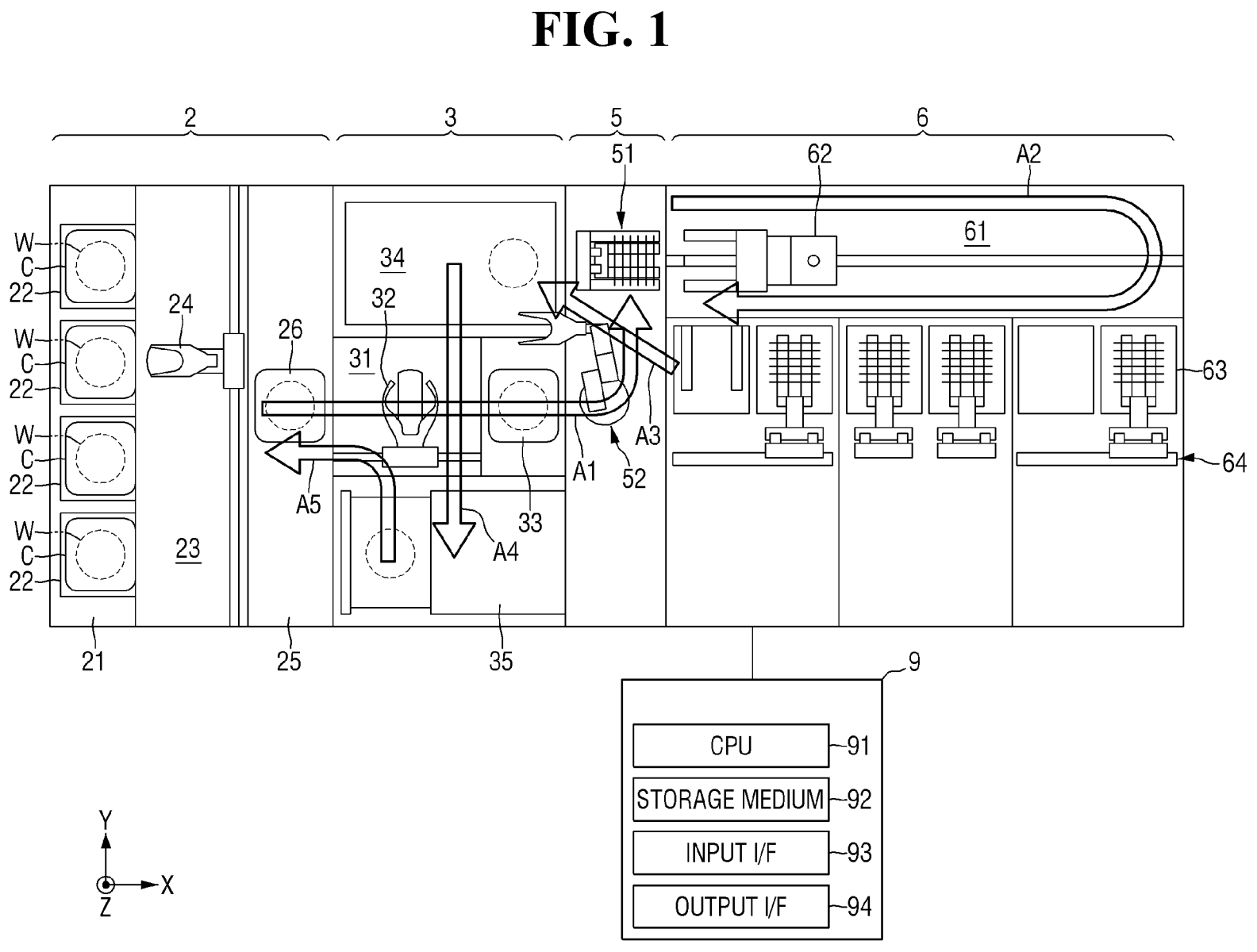

FIG. 1 is an exemplary conceptual diagram for describing a substrate processing apparatus according to some embodiments.

Referring to FIG. 1, the substrate processing apparatus includes a loading and unloading unit 2, a single wafer processing unit 3, an interface unit 5, a batch processing unit 6, and a control unit 9.

The loading and unloading unit 2 includes a stacking table 21. The stacking table 21 may stack a cassette C which stores a plurality of wafers W therein. The cassette C accommodates a plurality of wafers W and is loaded and unloaded to and from the loading and unloading unit 2. Inside the cassette C, the wafers W are horizontally held and spaced apart in a vertical direction (e.g., z-direction Z). The single wafer processing unit 3 processes the wafers W one by one. The interface unit 5 delivers the wafers W between the single wafer processing unit 3 and the batch processing unit 6. The batch processing unit 6 processes a plurality of wafers W collectively.

The loading and unloading unit 2, the single wafer processing unit 3, the interface unit 5, and the batch processing unit 6 are arranged sequentially along an x-direction X. The wafers W are transported from the loading and unloading unit 2 in the order of arrows A1, A2, A3, A4, and A5, and returned to the loading and unloading unit 2. The loading and unloading unit 2 may serve as both a loading unit and an unloading unit.

The stacking table 21 includes a plurality of stacking plates 22. A plurality of cassettes C are stacked on the plurality of stacking plates 22. The number of stacking plates 22 is not particularly limited. The number of cassettes C is not particularly limited.

The loading and unloading unit 2 includes a first transport region 23. The first transport region 23 may be adjacent to the stacking table 21. A first transport device 24 may be installed in the first transport region 23. The first transport device 24 has a first transport arm, and the first transport arm may be movable in a horizontal direction (e.g., x-direction X and y-direction Y) and in a vertical direction (e.g., z-direction Z). Also, the first transport arm may rotate about a vertical axis. The first transport arm transports the wafer W between the cassette C and a delivery unit 25 which will be described below. The number of first transport arms may be one or plural. If there are a plurality of first transport arms, the first transport device 24 may transport a plurality of wafers W collectively.

The loading and unloading unit 2 includes the delivery unit 25. The delivery unit 25 may be adjacent to the first transport region 23. The delivery unit 25 may include a first transition device 26 that temporarily holds the wafer W. A plurality of first transition devices 26 may be provided. At this time, the first transition devices 26 may be stacked in the z-direction Z. Each of the first transition devices 26 receives the wafer W from the first transport device 24 and temporarily stores it until it is delivered to a second transport device 32, which will be described below. Also, the first transition device 26 receives the wafer W from the second transport device 32 and temporarily stores it until it is delivered to the first transport device 24. For the simplicity of description, the present inventive concept applies to conveying the wafer W to various process equipments. The present invention is not limited thereto. The wafer W may be a substrate for manufacturing a display device.

The single wafer processing unit 3 may include a second transport region 31. The second transport region 31 may be adjacent to the delivery unit 25. The second transport device 32 may be installed in the second transport region 31. The second transport device 32 may include a second transport arm. The second transport arm may be movable in the x-direction X, y-direction Y, and z-direction Z. Additionally, the second transport arm may be rotatable about the vertical axis. The second transport arm may transport the wafer W between devices adjacent to the second transport region 31. The number of second transport arms may be one or plural. When there are a plurality of second transport arms, the second transport device 32 may transport the plurality of wafers W collectively.

The single wafer processing unit 3 may include a second transition device 33, a liquid processing device 34, and a drying device 35. The second transition device 33 may be adjacent to the second transport region 31. The second transition device 33 may receive the wafer W from the second transport device 32 and hold the wafer W until it is delivered to the interface unit 5. The liquid processing device 34 may process the wafers W one by one. The processing liquid used in the liquid processing device 34 may be pure water such as de-ionized water (DIW) or a dried liquid having a lower surface tension than that of pure water. The dried liquid may be an alcohol such as IPA. The drying device 35 may dry the wafers W one by one with the supercritical fluid.

The interface unit 5 may include a lot forming unit 51 and a transport unit 52. The lot forming unit 51 may support a plurality of wafers W. The transport unit 52 may transport the wafers W from the single wafer processing unit 3 to the lot forming unit 51 and further transport the wafer W from the batch processing unit 6 to the single wafer processing unit 3.

The batch processing unit 6 may include a third transport region 61. The third transport region 61 may be adjacent to the interface unit 5. A conveying robot 62 may be installed in the third transport region 61. The conveying robot 62 may include a plurality of robot arms. The plurality of robot arms may be movable in the x-direction X, the y-direction Y, and the z-direction Z. Additionally, the plurality of robot arms may be rotatable about the vertical axis. The conveying robot 62 may transport the wafer W between the devices adjacent to the third transport region 61.

The third transport region 61 may have a rectangular shape in a plan view. The third transport region 61 may extend in the x-direction X. For example, the third transport region 61 may extend lengthwise in the x-direction X. The interface unit 5 is disposed on a short side of the third transport region 61, and batch type chambers 63 may be disposed on a long side of the third transport region 61.

The batch processing unit 6 may receive the wafers W from the conveying robot 62 and convey the wafers W to the batch type chamber 63. The batch type chambers 63 may be disposed in the batch processing unit 6. Various semiconductor processes may be performed on the wafers W in the batch type chamber 63.

The batch processing unit 6 may further include a driving device 64. The driving device may move the processing tools inside the batch type chamber 63. The processing tool may support the wafers W inside the batch type chamber 63.

The control unit 9 may be, for example, a computer. The control unit 9 may include a central processing unit (CPU) 91, and a storage medium 92 such as a memory. The storage medium 92 stores programs for controlling various processes to be executed in the substrate processing apparatus. The control unit 9 controls the operation of the substrate processing apparatus by causing the CPU 91 to execute programs stored in the storage medium 92. Also, the control unit 9 may include an input interface 93 and an output interface 94. The control unit 9 receives signals from the outside using an input interface 93, and transmits signals from the outside using an output interface 94.

Further, the control unit 9 may rearrange the robot arms of the conveying robot 62, which will be described below. Detailed contents thereof will be described below.

The conveying robot according to some embodiments will be described in more detail below with reference to FIGS. 2 to 4.

FIG. 2 is a perspective view for explaining the conveying robot of FIG. 1. FIGS. 3 and 4 are side views for explaining the conveying robot of FIG. 2.

Figure 3:
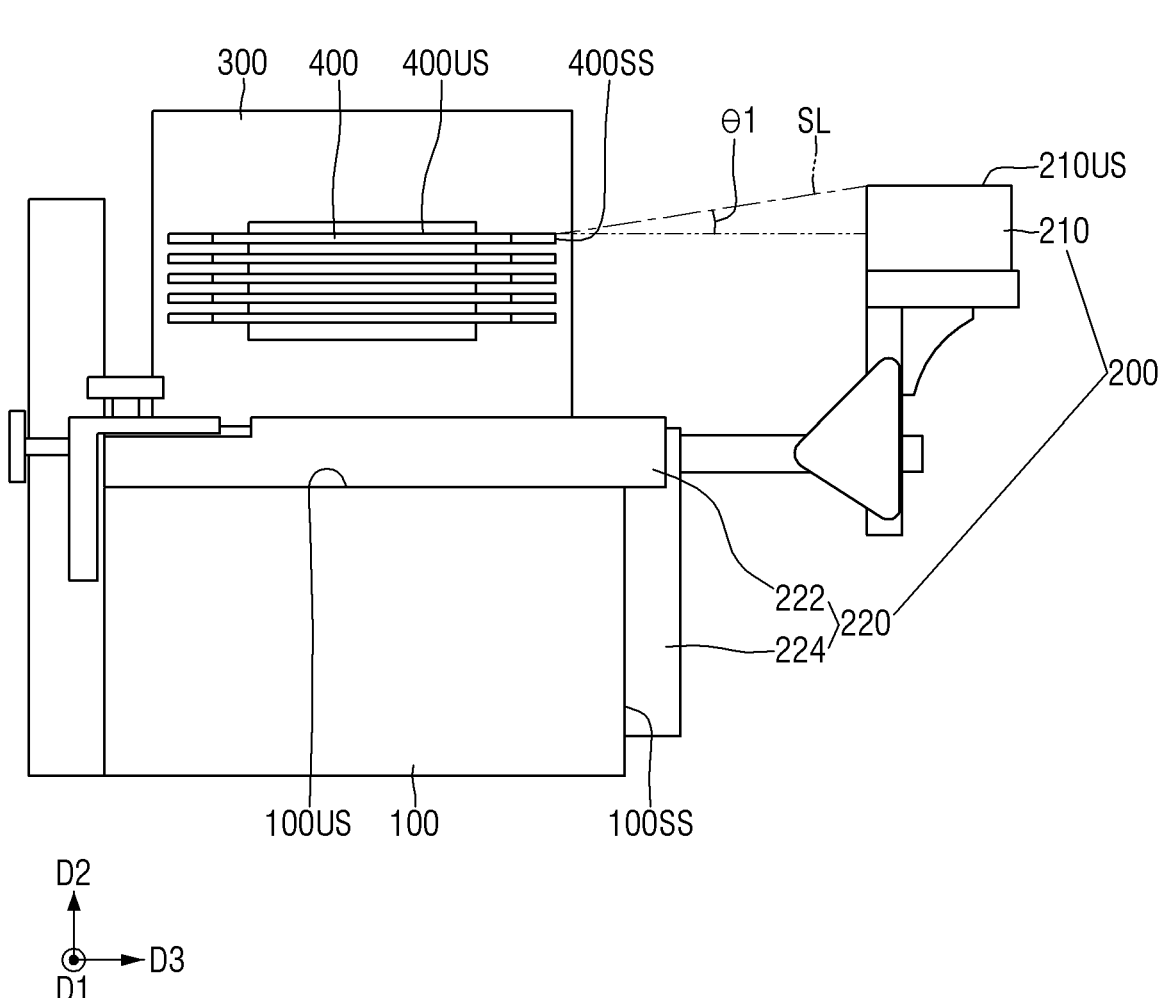
FIGS. 3 and 4 are side views for explaining the conveying robot of FIG. 2.
Figure 4:
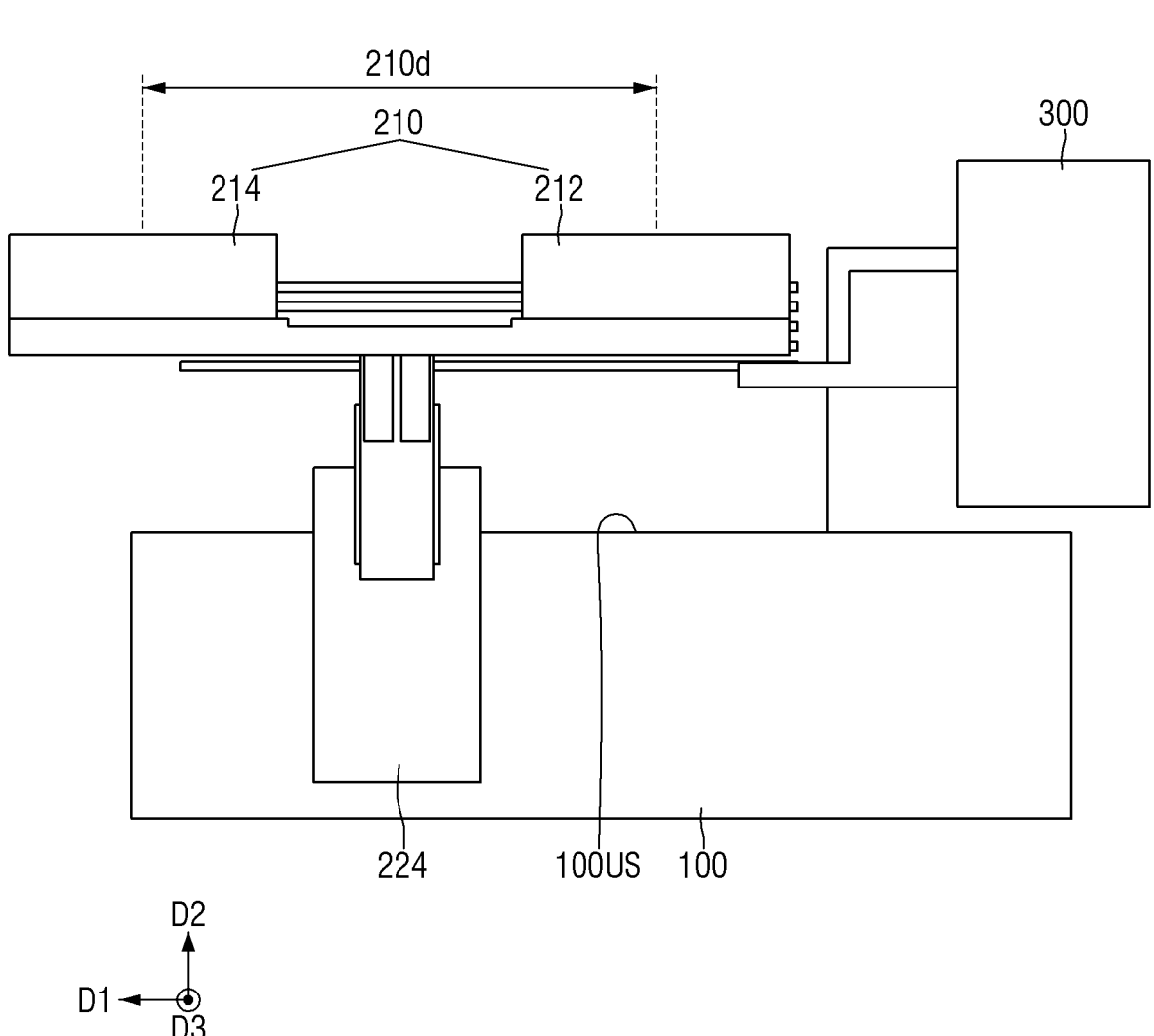

Referring to FIGS. 2 to 4, the conveying robot 62 according to some embodiments may include a body 100, an alignment jig (JIG) 200, a support base 300, and a plurality of robot arms 400.

The body 100 may have a rectangular parallelepiped shape. The body 100 may extend in a first direction D1. For example, the body 100 may extend lengthwise in the first direction D1. For example, an upper face 100US of the body 100 may have a rectangular shape extending parallel to a plane extending in the first direction D1 and the third direction D3. A long side of the upper face 100US of the body 100 may extend in the first direction D1, and a short side may extend in a third direction D3. Herein, the first direction D1, the second direction D2 and the third direction D3 may be substantially perpendicular to each other.

In some embodiments, the body 100 includes the upper face 100US and side faces 100SS. The upper face 100US of the body 100 may be placed on a plane extending in the first direction D1 and the third direction D3, and the side faces 100SS of the body 100 may be placed on a plane extending in the second direction D2 and the second direction D1. That is, the second direction D2 may be a direction perpendicular to the upper face 100US of the body 100, and the third direction D3 may be a direction perpendicular to the side face 100SS of the body 100. However, the technical idea of the present disclosure is not limited thereto.

The body 100 may be movable in the first direction D1. Also, the body 100 may be movable in the second direction D2. That is, the body 100 may move the plurality of robot arms 400 to desired positions. The plurality of robot arms 400 may each grip the wafer W. The body 100 may move in the first direction D1 and/or the second direction D2 to move the wafers W gripped by each of the plurality of robot arms 400 to a target process equipment in the batch processing unit 6 or to the lot forming unit 51.

The support base 300 may be installed on the body 100. The support base 300 may be installed on the upper face 100US of the body 100. The support base 300 may extend on the upper face 100US of the body 100 in the second direction D2. The support base 300 may be movable in the second direction D2. Accordingly, the plurality of robot arms 400 connected to the support base 300 may be movable in the second direction D2.

A plurality of robot arms 400 may be installed on the support base 300. The plurality of robot arms 400 may be installed on the side walls of the support base 300. The plurality of robot arms 400 may extend in the first direction D1. The plurality of robot arms 400 may be spaced apart from each other in the second direction D2. Each of the plurality of robot arms 400 may grip the wafer W. Each of the plurality of robot arms 400 may each grip the wafer W and load or unload the wafer W.

In some embodiments, the plurality of robot arms 400 may be five in number. That is, the conveying robot 62 may convey or transport the five wafers W at once. However, the number of robot arms 400 is not limited thereto. The number of robot arms 400 may be varied as desired depending on the product design.

In some embodiments, the plurality of robot arms 400 are aligned to a target position. The alignment of the plurality of robot arms 400 may mean that each robot arm 400 is arranged in parallel, each robot arm 400 is not twisted around a yaw axis, each robot arm 400 is not twisted around a pitch axis, and each robot arm 400 is not twisted around a roll axis.

In this specification, "twist of yaw axis" may mean a degree of rotation about the second direction D2 in a plane extending in the first direction D1 and the third direction D3. "Twist of the pitch axis" may mean a degree of rotation about the first direction D1 in a plane extending in the first direction D1 and the second direction D2. For example, the twist of the pitch axis may refer to a degree of a rotation of an upper surface of a robot arm relative to the first direction D1 in a plane extending in the first direction D1 and the second direction D2. "Twist of the roll axis" may mean a degree of rotation about the third direction D3 in a plane extending in the second direction D2 and the third direction D3.

An alignment jig (JIG) 200 may be installed on the upper face 100US and the side face 100SS of the body 100. The alignment jig (JIG) 200 may sense whether the robot arms 400 are aligned. For example, the alignment jig (JIG) 200 may sense the positions of the plurality of robot arms 400 relative a reference plane. The alignment jig (JIG) 200 may sense the coordinates of the upper faces and side faces of the plurality of robot arms 400.

In some embodiments, the alignment jig (JIG) 200 may include a displacement sensor 210 and a frame 220. In some embodiments, the displacement sensor 210 is a device that measures the distance between the sensor and an object by detecting the amount of displacement through a variety of elements and converting it into a distance. The displacement sensor 210 may be an optical displacement sensor, a linear proximity sensor, or an ultrasonic displacement sensor.

The frame 220 may include a horizontal frame 222 and a vertical frame 224. The horizontal frame 222 is installed on the upper face 100US of the body 100. The horizontal frame 222 may be in contact with the upper face 100US of the body 100. The horizontal frame 222 may extend in the third direction D3 on the upper face 100US of the body 100. For example, the horizontal frame 222 may extend lengthwise in the third direction D3. The vertical frame 224 is installed on the side face 100SS of the body 100. The vertical frame 224 may be in contact with the side faces 100SS of the body 100. The vertical frame 224 may extend in the second direction D2 on the side face 100SS of the body 100. For example, the vertical frame 224 may extend lengthwise in the second direction D2.

In some embodiments, the frame 220 may be used as a reference plane for the positions of the robot arms 400 sensed by the displacement sensor 210 to be described below. In some embodiments, the upper face 100US of the body 100 and the side face 100SS of the body 100 may be reference planes for the positions of the robot arms 400 sensed by the displacement sensor 210. That is, the lower face of the horizontal frame 222 and the side face of the vertical frame 224 may be used as reference planes for the positions of the robot arms 400 sensed by the displacement sensor 210. For example, the displacement sensor 210 may sense the coordinates of the upper faces and the side faces of the robot arms 400 on the basis of the upper face 100US of the body 100 and the side face 100SS of the body 100.

The displacement sensor 210 may be installed on the frame 220. The displacement sensor 210 may be installed on the side face 100SS of the body 100. The displacement sensor 210 may be spaced apart from the side face 100SS of the body 100 in the third direction D3, and may be spaced apart from the upper face 100US of the body 100 in the second direction D2. The displacement sensor 210 may be installed to face the side faces 400SS of the plurality of robot arms 400. The displacement sensor 210 may sense the positions of the plurality of robot arms 400. For example, the displacement sensor 210 may sense the coordinates of the upper faces 400US and the side faces 400SS of the plurality of robot arms 400.

In some embodiments, the displacement sensor 210 may include a first sensor 212 and a second sensor 214. The first sensor 212 and the second sensor 214 may be installed at the same vertical level. For example, the upper face of the first sensor 212 and the upper face of the second sensor 214 may be coplanar with each other.

The first sensor 212 and the second sensor 214 may be spaced apart from each other in the first direction D1. The first sensor 212 and the second sensor 214 may be spaced apart by a first distance 210d. The first distance 210d may be used to align the robot arms 400. For example, the first distance 210d may be used to sense twist of yaw axis and twist of pitch axis of the robot arms 400. The first sensor 212 and the second sensor 214 may sense the coordinates of the upper face 400US and side faces 400SS of the plurality of robot arms 400, respectively.

In some embodiments, the vertical level of the upper face 210US of the displacement sensor 210 may be higher than the vertical level of the upper face of each of the plurality of robot arms 400. For example, the vertical level of the upper face 210US of the displacement sensor 210 may be higher than the vertical level of the upper face 400US of the robot arm disposed at the highest level among the plurality of robot arms 400.

Additionally, in some embodiments, an imaginary reference line SL that connects from the side face 400SS of each of the plurality of robot arms 400 to the upper face 210US of the displacement sensor 210 may be provided. A first angle θ1 of the reference line SL may be greater than 0°, on the basis of a plane along which the first direction D1 and the third direction D3 extend as a reference plane. In some embodiments, the first angle θ1 of the reference line SL may be greater than 5° and smaller than 35°, on the basis of a plane along which the first direction D1 and the third direction D3 extend as a reference plane. In some embodiments, the first angle θ1 of the reference line SL may be greater than 15° and smaller than 25°, on the basis of a plane along which the first direction D1 and the third direction D3 extend as a reference plane, but the embodiment is not limited thereto. If the angle of the reference line SL is greater than 15° and smaller than 25°, the coordinates of the upper face 400US and the side face 400SS of the robot arm 400 may be sensed more accurately. However, the technical idea of the present disclosure is not limited thereto. In some embodiments, the angle of the reference line SL may be 0° or smaller than 0°.

The vertical level of the upper face 210US of the displacement sensor 210 is higher than the vertical levels of the upper faces 400US of each of the plurality of robot arms 400, and the angle θ1 of the reference line SL is greater than 0 on the basis of the plane along which the first direction D1 and the third direction D3 extend as a reference plane.

Accordingly, the displacement sensor 210 may sense the upper faces 400US and side faces 400SS of each of the plurality of robot arms 400.

Figure 5:
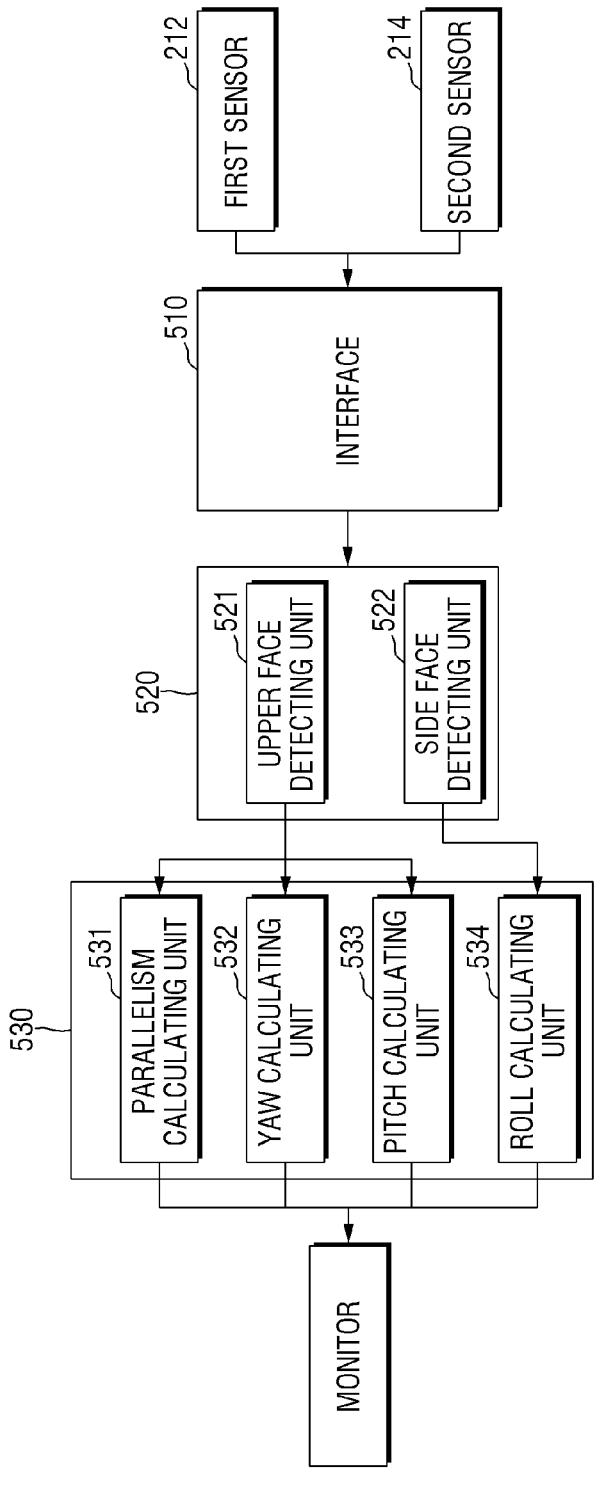
FIG. 5 is an exemplary block diagram for explaining a control unit of FIG. 1.

FIG. 5 is an exemplary block diagram for explaining the control unit 9 of FIG. 1. Referring to FIG. 5, the control unit may include an interface 510, a detecting unit 520, and a calculating unit 530. The control unit may align the plurality of robot arms 400, using the positions of the plurality of robot arms 400 sensed by the displacement sensor 210.

First, the control unit may be provided with the positions of the plurality of robot arms 400 sensed by the first and second sensors 212 and 214. The positions of the plurality of robot arms 400 sensed by first and second sensors 212 and 214 may be provided to the interface 510.

The interface 510 may provide the positions of the robot arms 400 to the detecting unit 520. The detecting unit 520 may coordinate the positions of the provided robot arms 400. For example, the detecting unit 520 includes an upper face detecting unit 521 and a side face detecting unit 522. The upper face detecting unit 521 may coordinate the upper face 400US of the robot arm 400 sensed by the first and second sensors 212 and 214. The side face detecting unit 522 may coordinate the side face 400SS of the robot arm 400 sensed by the first and second sensors 212 and 214. The detecting unit 520 may provide the coordinates of the robot arm 400 to the calculating unit 530.

The calculating unit 530 may include a parallelism calculating unit 531, a yaw calculating unit 532, a pitch calculating unit 533, and a roll calculating unit 534.

The parallelism calculating unit 531 may calculate whether the first and second robot arms (410 and 420 of FIG. 6) adjacent in the second direction D2 are arranged to be parallel to each other. The yaw calculating unit 532 may calculate whether the first and second robot arms (410 and 420 of FIG. 11) adjacent in the second direction D2 are aligned around the second direction D2 as an axis. The pitch calculating unit 533 may calculate whether the first and second robot arms (410 and 420 of FIG. 15) adjacent in the second direction D2 are aligned around the first direction D1 as an axis. Finally, the roll calculating unit 534 may calculate whether the first and second robot arms (410 and 420 of FIG. 19) adjacent in the second direction D2 are aligned around the third direction D3 as an axis.

The calculating unit 530 may send the calculated results to the monitor. The plurality of robot arms 400 may be aligned on the basis of the results sent to the monitor. As described above, when using the substrate processing apparatus of the present disclosure, the alignment states of a plurality of robot arms 400 can be checked simultaneously. Further, the plurality of robot arms 400 can be aligned at once on the basis of the checked results. Accordingly, the reliability of the substrate processing apparatus can be improved.

A method of operating the substrate processing apparatus according to some embodiments will be described below with reference to FIGS. 6 to 22.

FIGS. 6 to 10 are diagrams for explaining a method of operating a substrate processing apparatus according to some embodiments. For reference, FIGS. 6 to 10 are diagrams for explaining the method of operating the parallelism calculating unit 531 of FIG. 5.

Figure 6:
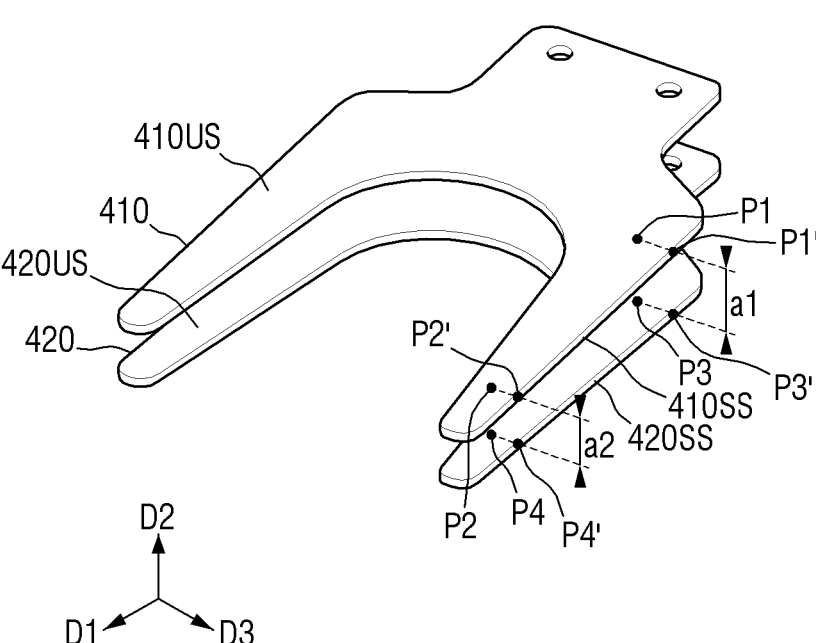
FIGS. 6 to 10 are diagrams for explaining the method of operating a substrate processing apparatus according to some embodiments.

Referring to FIG. 6, the plurality of robot arms 400 includes a first robot arm 410 and a second robot arm 420 that are adjacent to each other in the second direction D2. Although not shown, the displacement sensor 210 is provided on the first robot arm 410 and the second robot arm 420 at positions spaced apart in the third direction D3. The first robot arm 410 includes an upper face 410US and a side face 410SS. The second robot arm 420 includes an upper face 420US and a side face 420SS.

The displacement sensor 210 may sense the coordinates of the upper face 410US and the side face 410SS of the first robot arm 410. The displacement sensor 210 may sense the coordinates of the upper face 420US and the side face 420SS of the second robot arm 420.

Although not shown, a virtual first reference line which connects the side face 410SS of the first robot arm 410 to the upper face of the displacement sensor may be provided. Also, a virtual second reference line which connects the side face 420SS of the second robot arm 420 to the upper face of the displacement sensor may be provided. An angle of the first reference line and an angle of the second reference line may each be greater than 0° on the basis of the plane extending in the first direction D1 and the third direction D3 as a reference plane. For example, the angles of the first and second reference lines relative to the reference plane may be greater than 0°. In some embodiments, the angle of the first reference line and the angle of the second reference line may be greater than 5° and smaller than 35°, respectively, on the basis of the reference plane extending in the first direction D1 and the third direction D3 (i.e., relative to the reference plane). In some embodiments, the angle of the first reference line and the angle of the second reference line relative to the reference plane may be greater than 15° and smaller than 25°, respectively. However, the embodiment is not limited thereto.

In some embodiments, the first robot arm 410 may include a first position P1 and a second position P2. The first position P1 may be a position of the first robot arm 410 sensed by the first sensor 212. The second position P2 may be a position of the first robot arm 410 sensed by the second sensor 214. The second robot arm 420 may include a third position P3 and a fourth position P4. The third position P3 may be a position of the second robot arm 420 sensed by the first sensor 212. The fourth position P4 may be a position of the second robot arm 420 sensed by the second sensor 214. The first position P1 may correspond to the third position P3, and the second position P2 may correspond to the fourth position P4.

The first robot arm 410 and the second robot arm 420 may be spaced apart by a second distance a1 in the second direction D2. For example, the distance between the first position P1 and the third position P3 in the second direction D2 may correspond to the second distance a1. The first robot arm 410 and the second robot arm 420 may be spaced apart by a third distance a2 in the second direction D2. For example, the distance between the second position P2 and the fourth position P4 in the second direction D2 may correspond to the third distance a2. If the second distance a1 and the third distance a2 are different from each other, it may be determined that the first robot arm 410 and the second robot arm 420 are not parallel.

Figure 7:
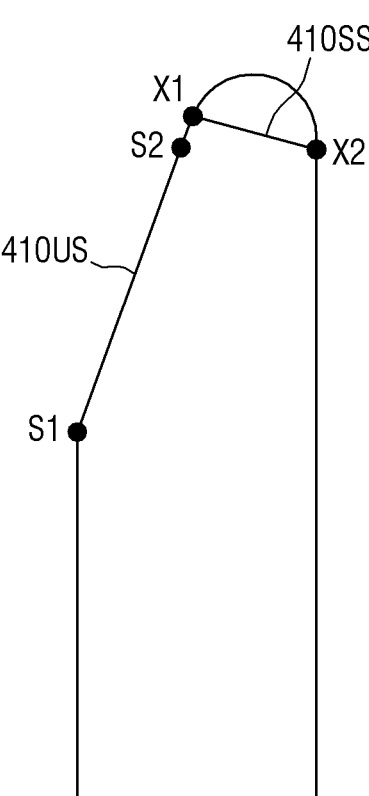

FIG. 7 is a diagram showing the coordinates of the first position P1 of the upper face 410US and a first position P1' of the side face 410SS of the first robot arm 410 that are sensed by the first sensor 212. S1 and S2 are coordinates of the first position P1 of the upper face 410US of the first robot arm 410. X1 and X2 are coordinates of the first position P1' of the side face 410SS of the first robot arm 410.

Figure 8:
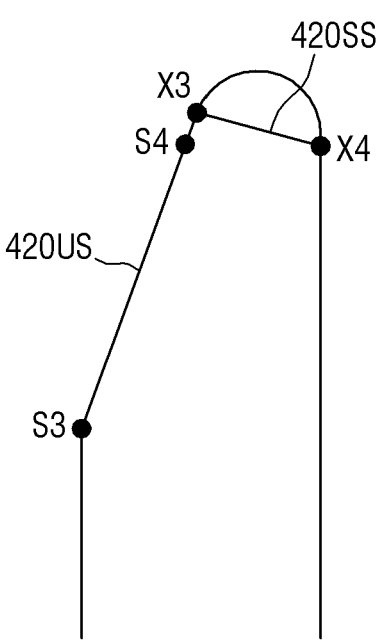

FIG. 8 is a diagram showing the coordinates of the third position P3 of the upper face 420US and a third position P3' of the side face 420SS of the second robot arm 420 that are sensed by the first sensor 212. S3 and S4 are coordinates of the third position P3 of the upper face 420US of the second robot arm 420. X3 and X4 are coordinates of the third position P3' of the side face 420SS of the second robot arm 420.

Specifically, X2 coordinate of the first position P1' and X3 coordinate of the third position P3' may be used to sense the parallelism of the first robot arm 410 and the second robot arm 420 (i.e., determine whether the first robot arm 410 and the second robot arm 420 are parallel with each other). The second distance a1 in the second direction D2 may be calculated, using the X2 coordinate and the X3 coordinate. For example, when the coordinate X2 of the first position P1' and the coordinate X3 of the third position P3' are spaced apart from each other in the second direction D2 or coordinates in the second direction D2, the difference between the coordinate X2 and the coordinate X3 may correspond to the second distance a1.

Figure 9:
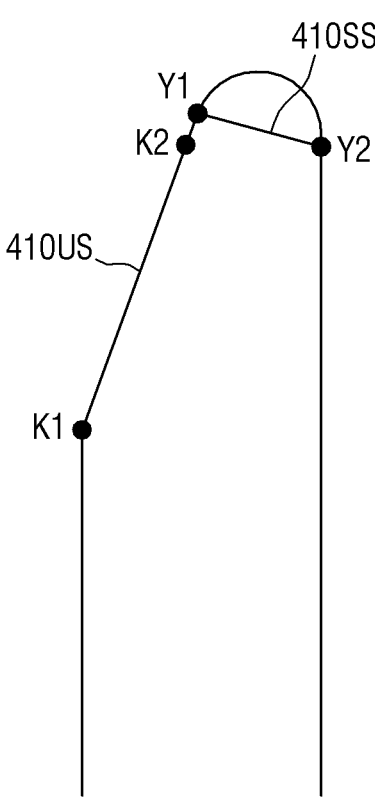

FIG. 9 is a diagram showing coordinates of the second position P2 of the upper face 410US and a second position P2' of the side face 410SS of the first robot arm 410 that are sensed by the second sensor 214. K1 and K2 are coordinates of the second position P2 of the upper face 410US of the first robot arm 410. Y1 and Y2 are coordinates of the second position P2' of the side face 410SS of the first robot arm 410.

Figure 10:
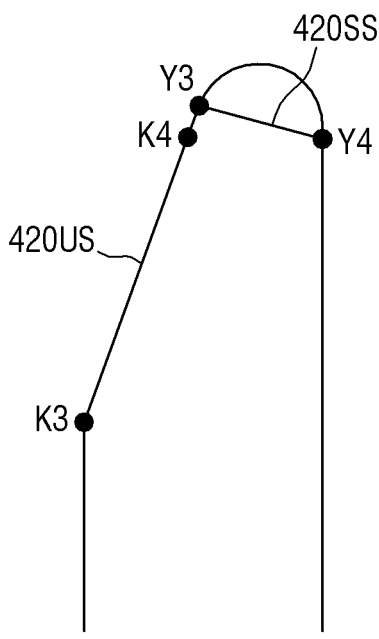

FIG. 10 is a diagram showing coordinates of the fourth position P4 of the upper face 420US and a fourth position P4' of the side face 420SS of the second robot arm 420 that are sensed by the second sensor 214. K3 and K4 are coordinates of the fourth position P4 of the upper face 420US of the second robot arm 420. Y3 and Y4 are the coordinates of the fourth position P4' of the side face 420SS of the second robot arm 420.

Specifically, Y2 coordinate of the second position P2' and Y3 coordinate of the fourth position P4' may be used to sense the parallelism of the first robot arm 410 and the second robot arm 420 (i.e., determine whether the first robot arm 410 and the second robot arm are parallel with each other). The third distance a2 in the second direction D2 may be calculated, using the Y2 coordinate and the Y3 coordinate. For example, when the coordinate Y2 of the second position P2' and the coordinate Y3 of the third position P3' are spaced apart from each other in the second direction D2 or coordinates in the second direction D2, the difference between the coordinate Y2 and the coordinate Y3 may correspond to the second distance a2.

The parallelism of the first robot arm 410 and the second robot arm 420 may be sensed by comparing the calculated second distance a1 and the third distance a2. For example, whether the first robot arm 410 and the second robot arm 420 are parallel with each other may be determined by calculating the difference between the second distance a1 and the third distance a2. When the difference is 0, the first robot arm 410 and the second robot arm 420 are determined as parallel with each other. The calculated results may be sent to the monitor shown in FIG. 5. For the simplicity of description, the parallelism is determined for the first and second robot arms 410 and 420. If M robot arms are provided (M is an integer greater than 2), the parallelism determination as described above can apply to two adjacent robot arms in the second direction among the M robot arms.

Figure 11:
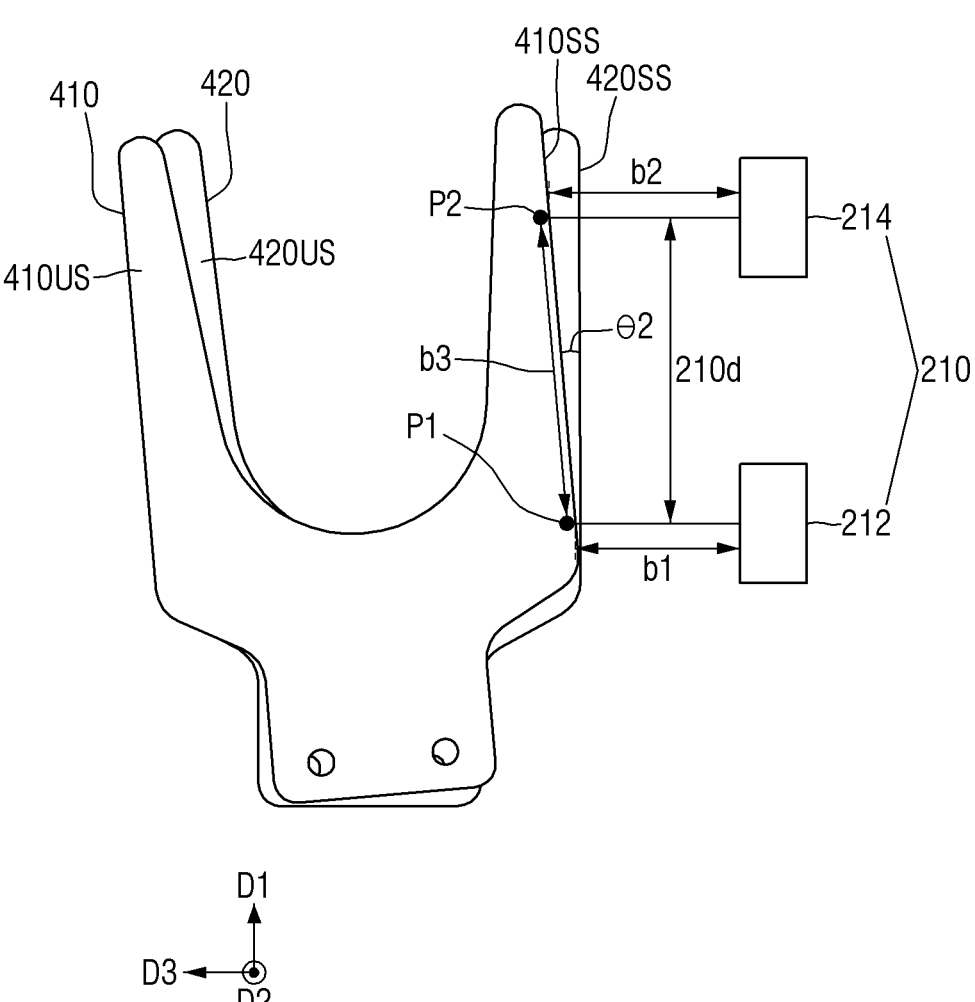
FIGS. 11 to 14 are diagrams for explaining a method of operating a substrate processing apparatus according to some embodiments.

FIGS. 11 to 14 are diagrams for explaining a method of operating a substrate processing apparatus according to some embodiments. For reference, FIGS. 11 to 14 are diagrams for explaining a method of operating the yaw calculating unit 532 of FIG. 5. FIG. 11 is a plan view of the first robot arm 410 and the second robot arm 420.

Referring to FIG. 11, the plurality of robot arms 400 include a first robot arm 410 and a second robot arm 420 that are adjacent to each other in the second direction D2.

The displacement sensor 210 may sense the twist of the yaw axis of the first robot arm 410 and the second robot arm 420. "Twist of yaw axis" may mean that the robot arm twists about the second direction D2 in a first imaginary projection plane IPP1 extending in the first direction D1 and the third direction D3 relative to a reference plane extending in the first direction D1 and the third direction D3. For example, in the first imaginary plane in which the first direction D1 and the third direction D3 extend, an angle between the side face 410SS of the first robot arm 410 and the side face 420SS of the second robot arm 420 may be a second angle θ2 which represents a degree of the twist of a yaw axis that is parallel to the second direction D2. If the second angle θ2 is greater than 0°, it may be determined that the first robot arm 410 and the second robot arm 420 are not aligned with the yaw axis. For the convenience of description, in the above description, the side surface 420SS of the second robot arm 420 is aligned with the reference plane extending in the first direction D1 and the third direction D3, and the second angle θ2 may correspond to a degree of twist of the first side surface 410SS of the first robot arm 410 relative to the second direction D2 in the first imaginary projection plane IPP1 which is parallel to the first reference plane. If the second angle θ2 of the first robot arm 410 is greater than 0°, the side surface 410SS of the first robot arm 410 may be determined as not aligned with the yaw axis (i.e., the second direction D2). The calculation of the degree of the twist of a yaw axis may apply to the side surface 420SS of the second robot arm 420. In some embodiments, if M robot arms are provided (M is an integer greater than 2), the calculation of the degree of the twist of a yaw axis may be performed for each robot arm among the M robot arms. For the convenience of description, hereinafter, it is assumed that the side surface 420SS of the second robot arm 420 is aligned with the reference plane, and thus the calculation of the degree of the twist of a yaw axis for the second robot arm 420 may be omitted.

The displacement sensor 210 may sense the coordinates of the side face 410SS of the first robot arm 410 and the side face 420SS of the second robot arm 420. For example, first sensor 212 and second sensor 214 may sense the coordinates of the side face 410SS of first robot arm 410. The first sensor 212 and the second sensor 214 may sense the coordinates of the side face 420SS of the second robot arm 420.

In some embodiments, the first and second robot arms 410 and 420 may include a first position P1 and a second position P2, in terms of a plan view in which the first direction D1 and the third direction D3 extend. For example, the first robot arm 410 may include the first and second positions P1 and P2 on the first side surface 410SS, which are projected along the second direction D2 onto the first imaginary projection plane IPP1 extending in the first and third directions D1 and D3. More specifically, the first and second positions P1 and P2 may be projected onto the first imaginary projection plane IPP1, and coordinates of the first and second positions P1 and P2 may be obtained by the first and second sensors 212 and 214, respectively. The first sensor 212 and the second sensor 214 may be on a plane parallel to the first reference plane extending in the first and third directions D1 and D3.

The first sensor 212 may sense the coordinates of the first position P1 of the side face 410SS of the first robot arm 410. The second sensor 214 may sense the coordinates of the second position P2 of the side face 410SS of the first robot arm 410. The first sensor 212 may sense the coordinates of positions of the side face 420SS of the second robot arm 420. The positions of the side face 420SS may correspond to the first and second positions P1 and P2.

Figure 12:
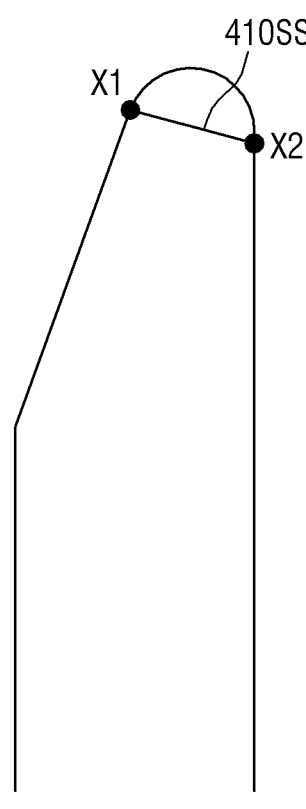

FIG. 12 is a diagram showing coordinates of the first position P1 of the side face 410SS of the first robot arm 410 that are sensed by the first sensor 212. X1 and X2 are the coordinates of the side face 410SS of the first robot arm 410 at the first position P1. X1 and X2 may be coordinates of the first position P1 of the side face 420SS of the second robot arm 420.

Figure 13:
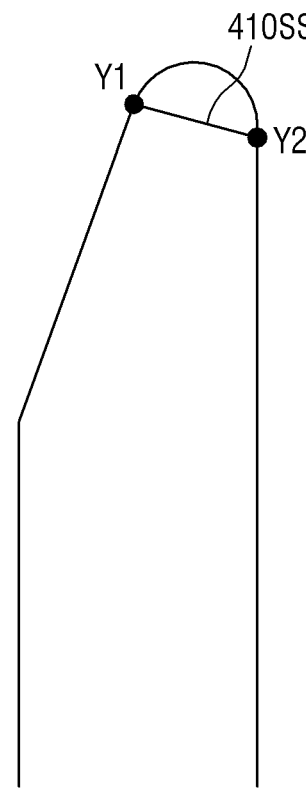

FIG. 13 is a diagram showing coordinates of the second position P2 of the side face 410SS of the first robot arm 410 that are sensed by the second sensor 214. Y1 and Y2 are coordinates of the second position P2 of the side face 410SS of the first robot arm 410.

A fourth distance b1 in the third direction D3 from the first sensor 212 to the first position of the side face 410SS of the first robot arm 410 may be calculated, using an intermediate value between X1 and X2. In some embodiments, when the X1 is a coordinate in the third direction D3, the fourth distance b1 may correspond to the X1 (or a difference between the X1 and a corresponding coordinate of the first sensor 212 in the third direction D3). A fifth distance b2 in the third direction D3 from the second sensor 214 to the second position P2 of the side face 410SS of the first robot arm 410 may be calculated, using an intermediate value between Y1 and Y2. In some embodiments, when the Y1 is a coordinate in the third direction D3, the fifth distance b2 may correspond to the Y1 (or a difference between the Y1 and a corresponding coordinate of the second sensor 214 in the third direction D3). A sixth distance b3 from the first position P1 to the second position P2 may be calculated, using the intermediate value between X1 and X2 and the intermediate value between Y1 and Y2.

Figure 14:
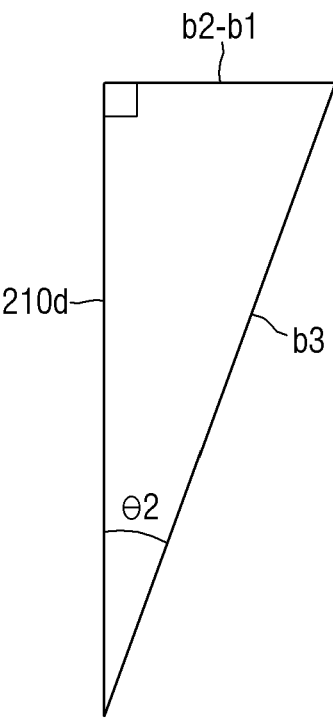

Referring to FIG. 14, twist of yaw axis may be sensed or calculated, using the sixth distance b3 from the first position P1 to the second position P2, the fourth distance b1 in the third direction D3 from the first sensor 212 to the side face 410SS of the first robot arm 410 at the first position P1, the fifth distance b2 in the third direction D3 from the second sensor 214 to the side face 410SS of the first robot arm 410 at the second position P2, and the first distance 210d in the first direction D1 between the first sensor 212 and the second sensor 214. Specifically, the twisted angle between the first robot arm 410 and the second robot arm 420a may be calculated, using a trigonometric function.

In FIG. 14, with a right-angled triangle as a reference, a lower side is a first distance 210d, a height is a difference (b2−b1) between the fifth distance b2 and the fourth distance b1, and an oblique side is a sixth distance b3. The second angle θ2 between the lower side and the oblique side may be calculated, using the calculated first distance 210d and the fourth to sixth distances b1, b2, and b3. The twist of yaw axis of the first robot arm 410 and the second robot arm 420 may be sensed, using the second angle θ2.

Figure 15:
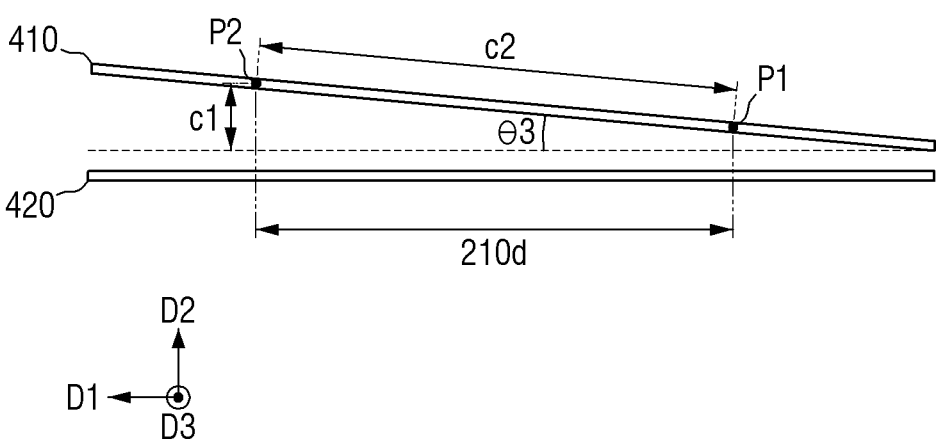
FIGS. 15 to 18 are diagrams for explaining a method of operating a substrate processing apparatus according to some embodiments.

FIGS. 15 to 18 are diagrams for explaining a method of operating a substrate processing apparatus according to some embodiments. For reference, FIGS. 15 to 18 are diagrams for explaining the operating method of the pitch calculating unit 533 of FIG. 18. FIG. 15 is a plan view of the first robot arm 410 and the second robot arm 420 viewed from the side face.

Referring to FIG. 15, the plurality of robot arms 400 include a first robot arm 410 and a second robot arm 420 that are adjacent to each other in the second direction D2.

The displacement sensor 210 may sense the twist of the pitch axis of the first robot arm 410 and the second robot arm 420. "Twist of pitch axis" may mean that the robot arm twists about the first direction D1 in a second imaginary projection plane IPP2 extending in the first direction D1 and the second direction D2 relative to the reference plane extending in the first direction D1 and the third direction D3. For example, in the second imaginary projection plane IPP2, the angle between the side face 410SS of the first robot arm 410 and the side face 420SS of the second robot arm 420 may be a third angle θ3 which represents a degree of the twist of a pitch axis that is parallel to the first direction D1. If the third angle θ3 is greater than 0°, it may be determined that the first robot arm 410 and the second robot arm 420 are not aligned with the pitch axis. For the convenience of description, in the above description, the side surface 420SS of the second robot arm 420 is aligned with the reference plane extending in the first direction D1 and the third direction D3, and the third angle θ3 may correspond to a degree of twist of the first side surface 410SS of the first robot arm 410 relative to the first direction D1 (or relative to the first reference plane) in the second imaginary projection plane IPP2. If the third angle θ3 of the first robot arm 410 is greater than 0°, the side surface 410SS of the first robot arm 410 may be determined as not aligned with the pitch axis (i.e., the first direction D1). The calculation of the degree of the twist of a pitch axis may apply to the side surface 420SS of the second robot arm 420. In some embodiments, if M robot arms are provided (M is an integer greater than 2), the calculation of the degree of the twist of a pitch axis may be performed for each robot arm among the M robot arms. For the convenience of description, hereinafter, it is assumed that the side surface 420SS of the second robot arm 420 is aligned with the reference plane, and thus the calculation of the degree of the twist of a pitch axis for the second robot arm 420 may be omitted.

In some embodiments, the first robot arm 410 may include a first position P1 and a second position P2, in terms of a plan view in which the first direction D1 and the second direction D2 extend. For example, the first robot arm 410 may include the first and second positions P1 and P2 on the first side surface 410SS, which are projected along the third direction D3 onto the second imaginary projection plane IPP2 extending in the first and second directions D1 and D2. More specifically, the first and second positions P1 and P2 may be projected onto the second imaginary projection plane IPP2, and coordinates of the first and second positions P1 and P2 may be obtained by the first and second sensors 212 and 214, respectively. The first sensor 212 and the second sensor 214 may be on a plane parallel to the first reference plane defined by the first and third directions D1 and D3.

The first sensor 212 may sense the coordinates of the first position P1 of the side face 410SS of the first robot arm 410. The second sensor 214 may sense the coordinates of the second position P2 of the side face 410SS of the first robot arm 410.

Figure 16:
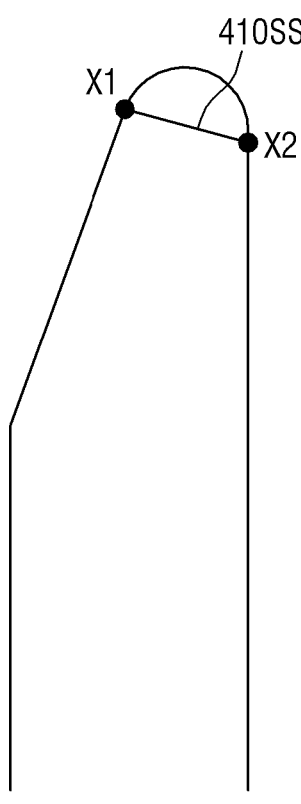

FIG. 16 is a diagram showing coordinates of the first position P1 of the side face 410SS of the first robot arm 410 that are sensed by the first sensor 212. X1 and X2 are coordinates of the first position P1 of the side face 410SS of the first robot arm 410. X1 may be an upper part of the side surface 410SS of the first robot arm 410. X2 may be a lower part of the side surface 410SS of the first robot arm 410.

Figure 17:
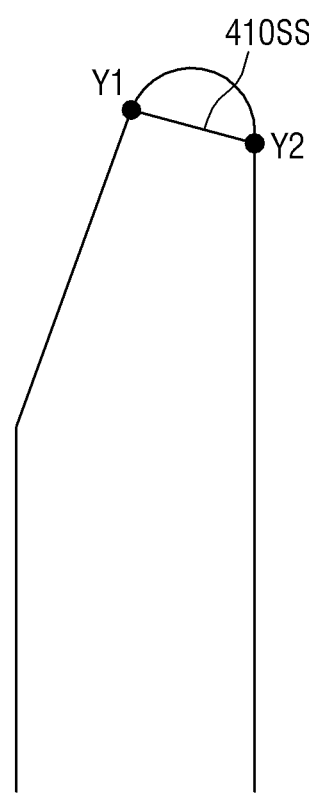

FIG. 17 is a diagram showing coordinates of the second position P2 of the side face 410SS of the first robot arm 410 that are sensed by the second sensor 214. Y1 and Y2 are coordinates of the second position P2 of the side face 410SS of the first robot arm 410. Y1 may be an upper part of the side surface 410SS of the first robot arm 410. Y2 may be a lower part of the side surface 410SS of the first robot arm 410.

A seventh distance c1 in the second direction D2 from the first position P1 to the second position P2 may be calculated, using the intermediate value between X1 and X2 and the intermediate value between Y1 and Y2. For example, the seventh distance c1 may correspond to a distance between the first and second positions P1 and P2 in the second direction D2. When the X2 and Y2 correspond to coordinate values in the second direction D2, the difference between the X2 and Y2 may correspond to the seventh distance c1. An eighth distance c2 from the first position P1 to the second position P2 may be calculated using X1, X2, Y1, and Y2.

Figure 18:
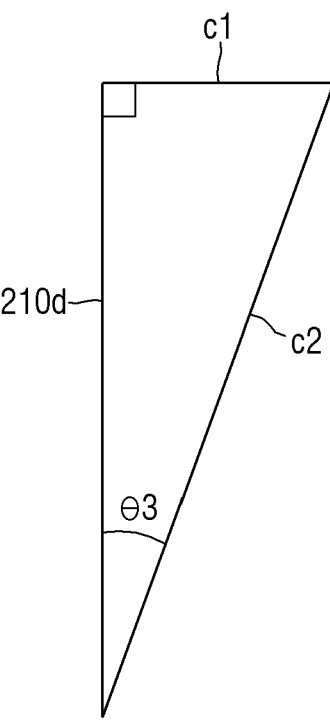

Referring to FIG. 18, twist of pitch axis may be sensed or calculated, using the eighth distance c2 from the first position P1 to the second position P2, the seventh distance c1 in the second direction D2 from the first position P1 to the second position P2, and the first distance 210d in the first direction D1 between the first sensor 212 and the second sensor 214. Specifically, the twisted angle between the first robot arm 410 and the second robot arm 420 may be calculated, using a trigonometric function.

In FIG. 18, the lower side is the first distance 210d, the height is the seventh distance c1, and the oblique side is the eighth distance c2, on the basis of the right-angled triangle. A third angle θ3 between the lower side and the oblique side may be calculated, using the calculated first distance 210d and the seventh and eighth distances c1 and c2. The twist of the pitch axis of the first robot arm 410 and the second robot arm 420 may be sensed, used the third angle θ3.

Figure 19:
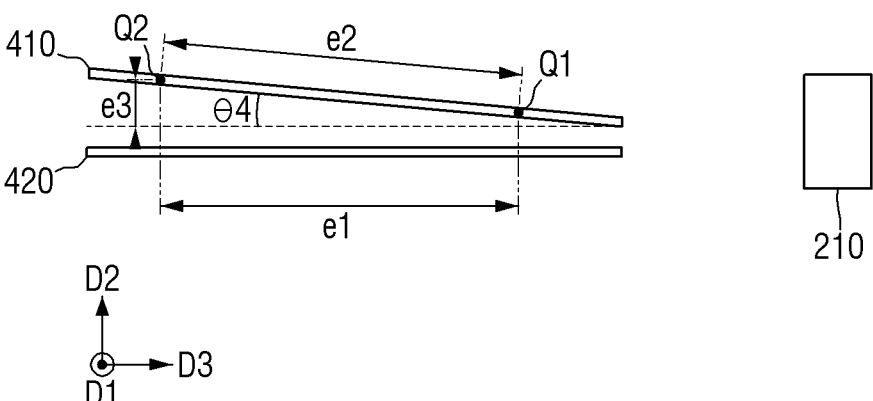
FIGS. 19 to 22 are diagrams for explaining a method of operating a substrate processing apparatus according to some embodiments.

FIGS. 19 to 22 are diagrams for explaining a method of operating a substrate processing apparatus according to some embodiments. For reference, FIGS. 19 to 22 are diagrams for explaining the method of operating the roll calculating unit 534 of FIG. 5. FIG. 19 is a plan view of the first robot arm 410 and the second robot arm 420 viewed from the front.

Referring to FIG. 19, the plurality of robot arms 400 include a first robot arm 410 and a second robot arm 420 that are adjacent to each other in the second direction D2.

The displacement sensor 210 may sense the twist of the roll axis of the first robot arm 410 and the second robot arm 420. "Twist of the roll axis" may mean that the robot arm twists about the third direction D3 in a third imaginary projection plane IPP3 extending in the second direction D2 and the third direction D3 relative to the reference plane extending in the first direction D1 and the third direction D3. For example, in the third imaginary projection plane IPP3, an angle between the upper face 410US of the first robot arm 410 and the upper face 420US of the second robot arm 420 may be a fourth angle θ4 which represents a degree of the twist of a roll axis that is parallel to the third direction D3. If the fourth angle θ4 is greater than 0°, it may be determined that the first robot arm 410 and the second robot arm 420 are not aligned with the roll axis. For the convenience of description, in the above description, the upper surface 420US of the second robot arm 420 is aligned with the reference plane extending in the first direction D1 and the third direction D3, and the fourth angle θ4 may correspond to a degree of twist of the first upper surface 410US of the first robot arm 410 relative to the third direction D3 (or relative to the first reference plane) in the third imaginary projection plane IPP3. If the fourth angle θ4 of the first robot arm 410 is greater than 0°, the upper surface 410US of the first robot arm 410 may be determined as not aligned with the roll axis (i.e., the third direction D3). The calculation of the degree of the twist of a roll axis may apply to the upper surface 420US of the second robot arm 420. For example, if M robot arms are provided (M is an integer greater than 2), the calculation of the degree of the twist of a roll axis may be performed for each robot arm among the M robot arms. For the convenience of description, hereinafter, it is assumed that the upper surface 420US of the second robot arm 420 is aligned with the reference plane, and thus the calculation of the degree of the twist of a roll axis for the second robot arm 420 may be omitted.

The displacement sensor 210 may sense coordinates of the upper face 410US of the first robot arm 410. The displacement sensor 210 may sense coordinates of the upper face 420US of the second robot arm 420. For example, the first robot arm 410 may include third and fourth positions Q1 and Q2 on the first upper surface 410US, which are projected along the first direction D1 onto the third imaginary projection plane IPP3 extending in the second and third directions D2 and D3. More specifically, the third and fourth positions Q1 and Q2 may be projected onto the third imaginary projection plane IPP3, and coordinates of the third and fourth positions Q1 and Q2 may be obtained by the first and second sensors 212 and 214, respectively. The first sensor 212 and the second sensor 214 may be on a plane parallel to the first reference plane defined by the first and third directions D1 and D3.

The first sensor 212 may sense the coordinates of the third position Q1 of the upper face 410US of the first robot arm 410. The second sensor 214 may sense the coordinates of the fourth position Q2 of the upper surface 410US of the first robot arm 410.

Figure 20:
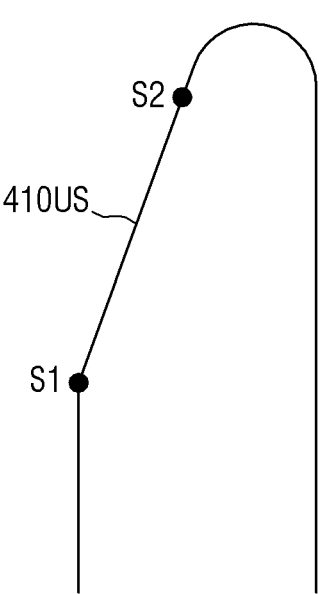
Figure 21:
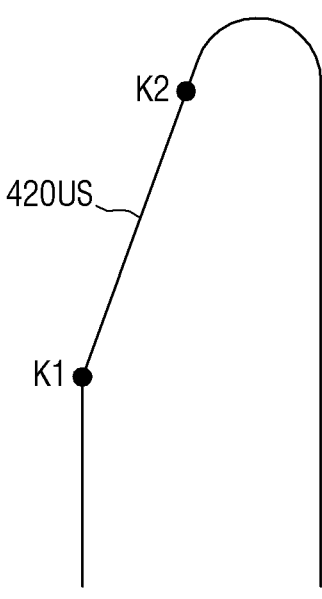

FIG. 20 is a diagram showing coordinates of the third position Q1 of the upper face 410US of the first robot arm 410 that are sensed by the first sensor 212. S1 and S2 are coordinates of the third position Q1 of the upper face 410US of the first robot arm 410. FIG. 21 is a diagram showing coordinates of the fourth position Q2 of the upper face 420US of the second robot arm 420 that are sensed by the second sensor 214. K1 and K2 are coordinates of the fourth position Q2 of the upper face 420US of the second robot arm 420.

A length e2 of the upper face 410US of first robot arm 410 at any two positions may be calculated, using S1 and S2. For example, the length e2 between the third position Q1 and the fourth position Q2 may be calculated, on the upper face 410US of the first robot arm 410.

A length e1 of the upper face 420US of the second robot arm 420 at any two positions may be calculated using the third and fourth positions Q1 and Q2. For example, the length e1 between two positions corresponding to the third position Q1 and the fourth position Q2 may be calculated on the upper face 420US of the second robot arm 420. For the convenience of description, the second robot arm 420 is assumed to be parallel to the reference plane extending in the first and third directions D1 and D3. The length e1 may correspond to a distance between the third and fourth positions Q1 and Q2 in the first direction D1. When the K1 and S1 correspond to coordinate values in the first direction D1, the difference between the K1 and S1 may correspond to the length e1. A spaced distance e3 in the second direction D2 between the first robot arm 410 and the second robot arm 420 may be calculated using the third and fourth positions Q1 and Q2. For the convenience of description, the second robot arm 420 is assumed to be parallel to the reference plane defined by the first and third directions D1 and D3.

The spaced distance e3 may correspond to a distance between the third and fourth positions Q1 and Q2 in the second direction D2. When the K2 and S2 correspond to coordinate values in the second direction D2, the difference between the K2 and S2 may correspond to the spaced length e3. For example, the spaced length e3 may correspond to a shortest difference between the fourth position Q4 and a corresponding position on an imaginary plane that is parallel to the upper surface 420US and intersects the third position Q1 of the upper surface 410US.

Figure 22:
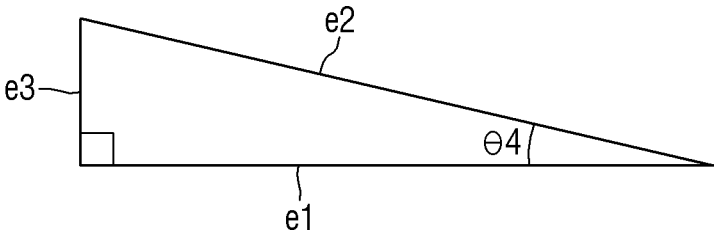

Referring to FIG. 22, the twist of roll axis may be sensed or calculated, using the length e2 from the third position Q1 to the fourth position Q2 on the upper face 410US of the first robot arm 410, the length e1 from the third position to the fourth position on the upper face 420US of the second robot arm 420, and the spaced distance e3 in the second direction D2 between the first robot arm 410 and the second robot arm 420 at the fourth position Q2. Specifically, the twisted angle between the first robot arm 410 and the second robot arm 420 may be calculated, using the trigonometric function.

In FIG. 22, on the basis of a right-angled triangle, the lower side is the length e1 of the upper face 420US of the second robot arm 420 at any two positions, the height is the spaced distance e3 in the second direction D2 between the first robot arm 410 and the second robot arm 420 at any position, and the oblique side is the length e1 of the upper face 420US of the second robot arm 420 at any two positions. Accordingly, a fourth angle $\theta4$ between the lower side and the oblique side may be calculated. The twist of the roll axis of the first robot arm 410 and the second robot arm 420 may be sensed, using the fourth angle $\theta4$.

As explained above, the parallelism, twist of the yaw axis, twist of the pitch axis, and twist of the roll axis of the robot arms 400 may be sensed, using the substrate processing apparatus according to some embodiments. The robot arms 400 may be aligned on the basis of the sensed results.

Figure 23:
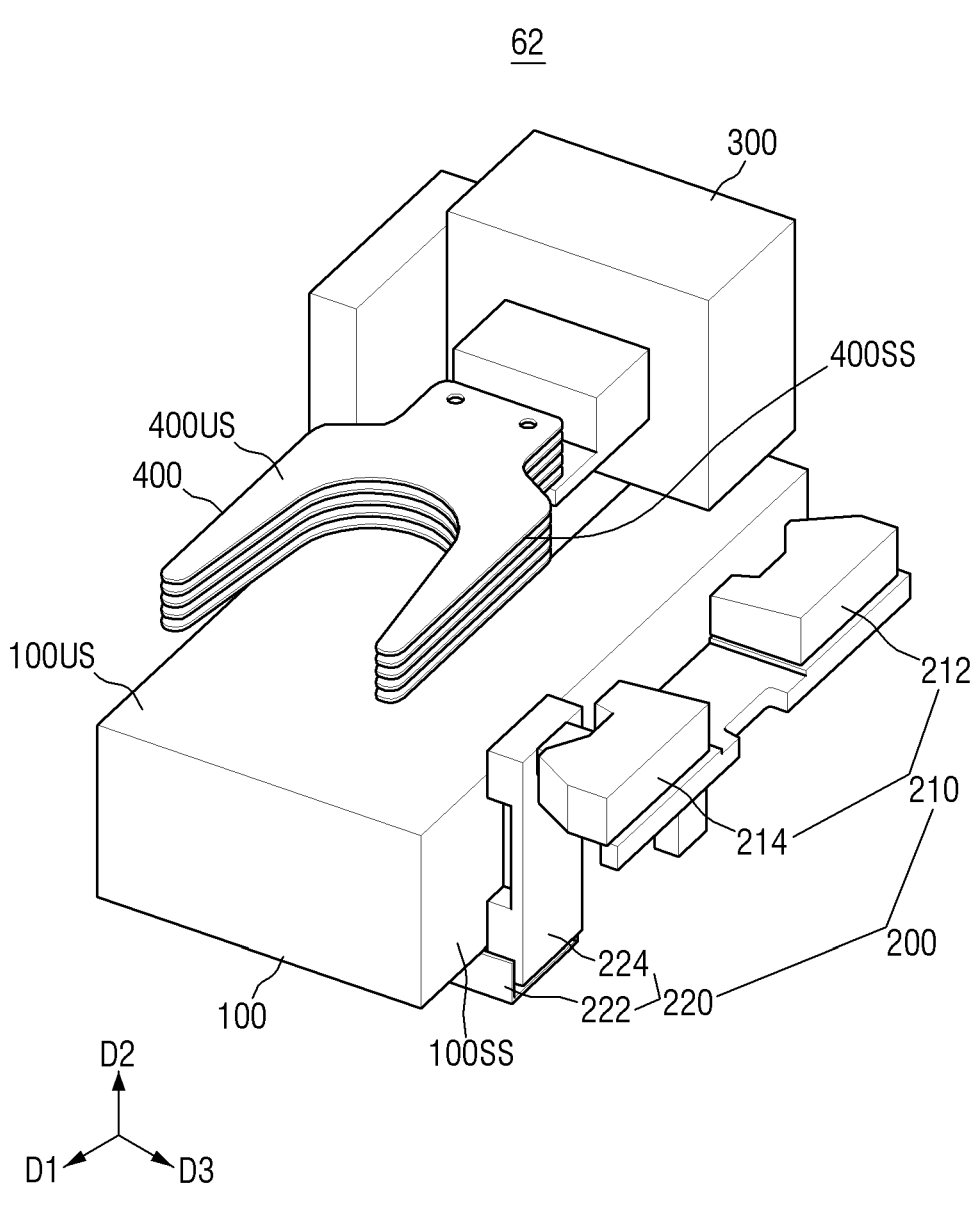
FIGS. 23 and 24 are diagrams for explaining a substrate processing apparatus according to some other embodiments.
Figure 24:
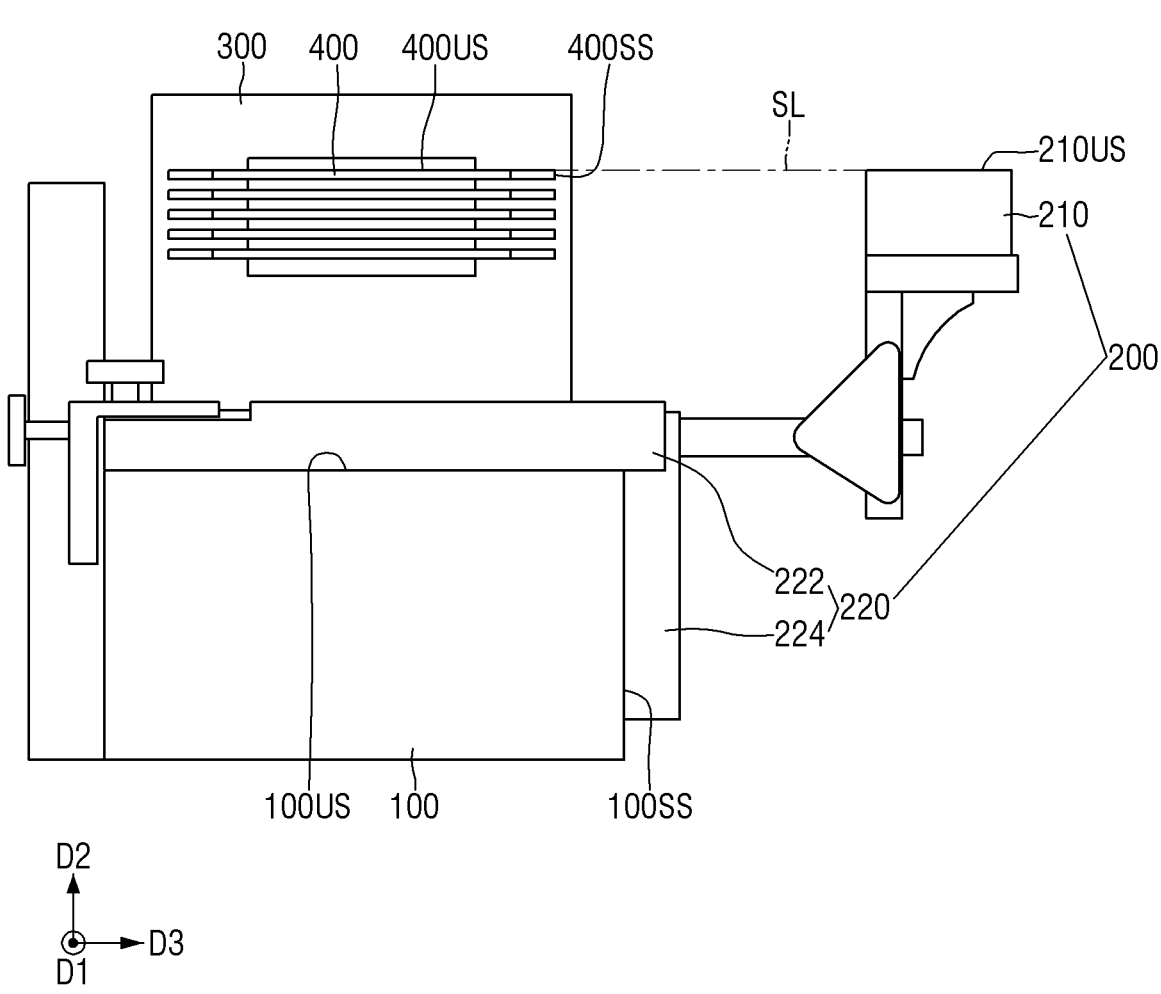

The substrate processing apparatus according to some other embodiments will be described below. FIGS. 23 and 24 are diagrams for explaining the substrate processing apparatus according to some other embodiments.

First, referring to FIG. 23, a horizontal frame 222 may be installed on the bottom face of the body 100. At this time, the bottom face of the body 100 may be used as a reference plane for the position of the robot arms 400 sensed by the displacement sensor 210. The upper face of the horizontal frame 222 may be used as a reference plane for the positions of the robot arms 400 sensed by the displacement sensor 210.

Referring to FIG. 24, the vertical level of the upper face 210US of the displacement sensor 210 may be the same as the vertical level of the upper face of the robot arm disposed at the highest level among the plurality of robot arms 400. That is, the upper face 210US of the displacement sensor 210 may be placed on the same plane as the upper face of the robot arm disposed at the highest level among the plurality of robot arms 400. However, the technical idea of the present disclosure is not limited thereto. It goes without saying that the vertical level of the upper face 210US of the displacement sensor 210 may be lower than the vertical level of the upper face of the robot arm disposed at the highest level among the plurality of robot arms 400.

In concluding the detailed description, those skilled in the art will appreciate that many variations and modifications may be made to the preferred embodiments without substantially departing from the principles of the present disclosure. Therefore, the disclosed preferred embodiments of the disclosure are used in a generic and descriptive sense only and not for purposes of limitation.

What is claimed is:

1. A substrate processing apparatus comprising:
a body which includes an upper face and side faces, and extends lengthwise in a first direction;
a plurality of robot arms which are installed on the upper face of the body, extend in the first direction, and are spaced apart from each other in a second direction perpendicular to the upper face of the body, wherein each of the plurality of robot arms is configured to grip a wafer; and
an alignment jig (JIG) which is installed on the upper face and side faces of the body, and senses positions of the plurality of robot arms,
wherein the JIG includes:
a horizontal frame disposed on the upper face of the body,
a vertical frame disposed on the side faces of the body, and
a displacement sensor installed on the horizontal frame and the vertical frame to sense coordinates of upper faces of the plurality of robot arms and side faces of the plurality of robot arms,
wherein the displacement sensor includes a first sensor and a second sensor which are spaced apart from the side faces of the plurality of robot arms in a third direction perpendicular to the first and second directions and spaced apart from each other in the first direction, and
wherein an upper face of the displacement sensor is disposed at a vertical level higher than a vertical level of an upper face of an uppermost robot arm, in the second direction, of the plurality of robot arms.

2. The substrate processing apparatus of claim 1, wherein the upper face of the body and the side faces of the body are each used as reference planes for positions of the plurality of robot arms sensed by the displacement sensor.

3. The substrate processing apparatus of claim 1, wherein the horizontal frame and the vertical frame are each used as reference planes for the positions of the plurality of robot arms sensed by the displacement sensor.

4. The substrate processing apparatus of claim 1, wherein an angle of a reference line which connects the side faces of the plurality of robot arms to the upper face of the displacement sensor relative to a reference plane extending in the first direction and the third direction is greater than 0°.

5. The substrate processing apparatus of claim 4, wherein the angle of the reference line is greater than 15° and smaller than 25°.

6. The substrate processing apparatus of claim 1, wherein the plurality of robot arms comprise a first robot arm and a second robot arm, and
wherein whether the first robot arm and the second robot arm are parallel with each other is determined using coordinates of the upper face and side faces of the first robot arm and coordinates of the upper face and side faces of the second robot arm.

7. The substrate processing apparatus of claim 6, further comprising:
a control unit coupled to the JIG,
wherein the side faces of the plurality of robot arms comprise a first position sensed by the first sensor and a second position sensed by the second sensor, and wherein the control unit is configured to calculate a degree of twist of a yaw axis between the first robot arm and the second robot arm using:

a distance in the third direction from the first sensor to the first position, a distance in the third direction from the second sensor to the second position, a distance from the first position to the second position, and a distance in the first direction between the first sensor and the second sensor.

8. The substrate processing apparatus of claim 6, further comprising:

a control unit coupled to the JIG, wherein the side faces of the plurality of robot arms comprise a first position sensed by the first sensor and a second position sensed by the second sensor, and wherein the control unit is configured to calculate a degree of twist of a pitch axis between the first robot arm and the second robot arm using:

a distance in the second direction from the second position to an imaginary plane that is parallel to a reference plane extending in the first direction and the third direction and intersects the first position, a distance from the first position to the second position, and a distance in the first direction between the first sensor and the second sensor.

9. The substrate processing apparatus of claim 6, further comprising:

a control unit coupled to the JIG, wherein the upper faces of the plurality of robot arms comprise a third position and a fourth position spaced apart from each other, and wherein the control unit is configured to calculate a degree of twist of a roll axis between the first robot arm and the second robot arm using:

a distance from the third position to the fourth position, a distance in the third direction from the third position to the fourth position, and a distance in the second direction from the third position to the fourth position.

10. A substrate processing apparatus comprising:

a body which includes an upper face and side faces, and extends lengthwise in a first direction;

first and second robot arms which are installed on the upper face of the body, extend in the first direction, and are spaced apart in a second direction perpendicular to the upper face of the body, wherein each of the first and second robot arms is configured to grip a wafer;

first and second sensors which are installed on the upper face and side faces of the body, sense coordinates of an upper face and side faces of the first and second robot arms, and are spaced apart from each other in the first direction; and a control unit configured to align the first and second robot arms using sensed positions of the first and second robot arms, wherein the side face of the first robot arm comprises a first position sensed by the first sensor, and a second position sensed by the second sensor, wherein the control unit is configured to:

determine whether the first robot arm and the second robot arm are parallel with each other using coordinates of the upper face and side faces of the first robot arm and coordinates of the upper face and side faces of the second robot arm; and calculate a degree of twist of a yaw axis between the first robot arm and the second robot arm using:

a distance in a third direction from the first sensor to the side face of the first robot arm, a distance in the third direction from the second sensor to the side face of the second robot arm, a distance from the first position to the second position, and a distance in the first direction between the first sensor and the second sensor, and wherein the first to third directions are perpendicular to each other.

11. The substrate processing apparatus of claim 10, wherein the control unit is configured to calculate a degree of twist of a pitch axis between the first robot arm and the second robot arm using:

a distance in the second direction from the second position to an imaginary plane that is parallel to a reference plane defined by the first direction and the third direction and intersects the first position, the distance from the first position to the second position, and the distance in the first direction between the first sensor and the second sensor.

12. The substrate processing apparatus of claim 10, wherein the upper face of the first robot arm comprises a third position and a fourth position spaced apart from each other, and wherein the control unit is configured to calculate a degree of twist of a roll axis between the first robot arm and the second robot arm using:

a distance from the third position to the fourth position, a distance in the third direction from the third position to the fourth position, and a distance in the second direction from the third position to the fourth position.

13. The substrate processing apparatus of claim 10, wherein an angle of a first reference line which connects the side face of the first robot arm to the upper faces of the first and second sensors, and an angle of a second reference line which connects the side face of the second robot arm to the upper faces of the first and second sensors are each greater than 0° relative to a reference plane extending in the first direction and the third direction.

14. The substrate processing apparatus of claim 13, wherein the angle of the first reference line and the angle of the second reference line are each greater than 15° and smaller than 25°.

15. The substrate processing apparatus of claim 10, wherein the upper face of the body and the side faces of the body are each used as reference planes for the coordinates of the upper faces and the side faces of the first and second robot arms sensed by the first and second sensors.

16. A substrate processing apparatus comprising:

a loading and unloading unit to and from which a wafer is loaded and unloaded;

a batch type chamber which performs semiconductor processes on the wafer; and a conveying robot which conveys the wafer to the batch type chamber, wherein the conveying robot includes:

a body which includes an upper face and side faces, and extends lengthwise in a first direction;

first and second robot arms which are installed on the upper face of the body, extend in the first direction, and are spaced apart in a second direction perpendicular to the upper face of the body, wherein each of the first and second robot arms is configured to grip the wafer;

an alignment jig (JIG) which is installed on the upper face and side faces of the body, and senses positions of the first and second robot arms; and a control unit configured to align the first and second robot arms using the sensed positions of the first and second robot arms, wherein the JIG includes:

a horizontal frame disposed on the upper face of the body, a vertical frame disposed on the side face of the body, and a displacement sensor installed on the horizontal frame and the vertical frame to sense coordinates of upper faces and side faces of the first and second robot arms, wherein the displacement sensor includes a first sensor and a second sensor which are spaced apart from the side faces of the first and second robot arms in a third direction perpendicular to the first and second directions, and are spaced apart from each other in the first direction, wherein the side face of the first robot arm includes a first position sensed by the first sensor and a second position sensed by the second sensor, and the upper face of the first robot arm includes a third position and a fourth position spaced apart from each other, wherein the control unit is configured to determine whether the first robot arm and the second robot arm are parallel with each other using coordinates of the upper face and side faces of the first robot arm and coordinates of the upper face and side faces of the second robot arm, wherein the control unit is configured to calculate a degree of twist of a yaw axis between the first robot arm and the second robot arm using:

a distance in the third direction from the first sensor to the first position of the side face of the first robot arm, a distance in the third direction from the second sensor to the second position, a distance from the first position to the second position, and a distance in the first direction between the first sensor and the second sensor, wherein the control unit is configured to calculate a degree of twist of a pitch axis between the first robot arm and the second robot arm using:

a distance in the second direction from the second position to an imaginary plane that is parallel to a reference plane extending in the first direction and the second direction, the distance from the first position to the second position, and the distance in the first direction between the first sensor and the second sensor, and wherein the control unit is configured to calculate a degree of a twist of a roll axis between the first robot arm and the second robot arm using:

a distance from the third position to the fourth position, a distance in the third direction from the third position to the fourth position, and a distance in the second direction from the third position to the fourth position.

17. The substrate processing apparatus of claim 16, wherein an angle of a first reference line which connects the side face of the first robot arm to the upper face of the displacement sensor, and an angle of a second reference line which connects the side face of the second robot arm to the upper face of the displacement sensor are each greater than 0 relative to a reference plane extending in the first direction and the third direction.

18. The substrate processing apparatus of claim 17, wherein the angle of the first reference line and the angle of the second reference line are each greater than 15° and smaller than 25°.

19. The substrate processing apparatus of claim 16, wherein the upper face of the body and the side face of the body are each used as a reference plane for the coordinates of the upper faces and side faces of the first and second robot arms, and wherein the coordinates are sensed by the displacement sensor.

20. The substrate processing apparatus of claim 16. wherein the horizontal frame and the vertical frame are each used as a reference plane for coordinates of the upper faces and side faces of the first and second robot arms, and wherein the coordinates are sensed by the displacement sensor.

* * * * *